May 7, 1968     J. SZYDLOWSKI     3,381,471

COMBUSTION CHAMBER FOR GAS TURBINE ENGINES

Filed Oct. 22, 1965     3 Sheets-Sheet 1

May 7, 1968   J. SZYDLOWSKI   3,381,471
COMBUSTION CHAMBER FOR GAS TURBINE ENGINES
Filed Oct. 22, 1965   3 Sheets-Sheet 3

United States Patent Office 3,381,471
Patented May 7, 1968

3,381,471
COMBUSTION CHAMBER FOR GAS TURBINE ENGINES
Joseph Szydlowski, Usine Turbomeca, Bordes, Basses-Pyrenees, France
Filed Oct. 22, 1965, Ser. No. 500,940
Claims priority, application France, Nov. 30, 1964, 996,755, Patent 1,424,457
9 Claims. (Cl. 60—39.65)

ABSTRACT OF THE DISCLOSURE

A centrifugal rotary fuel injection-type annular combustion chamber of recumbent L-shape, a common casing between a compressor and a turbine having a hollow-vaned nozzle diaphragm in its first stage, an outer wall and an inner wall of the casing bounding a combustion space along the small vertical branch of the recumbent L and a gas dilution space along the long horizontal branch, an internal cavity bounded by the inner wall and dilution air tubes from the outer chamber wall in the zone of separation of the combustion and dilution spaces, the inner chamber wall facing outlets of the dilution tubes, with an inclined substantially frusto-conical portion the smaller and larger bases of which are positioned in the combustion and dilution spaces respectively.

---

This invention relates to improvements to annular combustion chambers for gas turbine engines.

Such chambers are supplied with streams of air having different functions such as combustion, completion of combustion, and lowering of the temperature of the burnt gas by rendering the latter homogeneous before it passes through the turbine. The stream used for this latter purpose is generally called the dilution air stream, although part of it may serve to complete the combustion. Cooling the burnt gas and rendering its temperature homogeneous require that the gas travel a certain distance through the chamber, thereby necessitating a certain chamber length.

In centrifugal rotary fuel injection-type annular combustion chambers of recumbent L-shape, comprising, in a common casing positioned between the compressor and the turbine, an outer wall and an inner wall bounding a combustion space along the short vertical branch of the recumbent L and a gas dilution space along the long horizontal branch thereof, most of the dilution air is conveyed through radial tubes open at both ends and extending from the outer wall of the chamber, in the zone separating the combustion and gas dilution spaces. The dilution air conveying tubes open out substantially halfway along the distance separating the outer and inner combustion chamber walls, and the air issuing from these tubes supplies both the dilution space and the outer part of the combustion space whereat this air must complete the combustion process.

In such chambers, in order that the feed air conveyed through the inner wall be able to reach the internal cavity thereof whence it is distributed at the base of the combustion space, it must cross the hot gas stream of the dilution space and, to that end, this air issuing from the annular space formed between the common casing and the outer combustion chamber wall passes through the hollow guide vanes of the nozzle diaphragm of the first stage of the turbine to enter said internal cavity.

It is an object of the present invention to very markedly improve both the combustion and the dilution while at the same time reducing the length of the combustion chamber, and in accordance with this object the inner chamber wall embodies, facing the dilution air delivering radial tubes, a generally frusto-conical shaped inclined portion the smaller and larger bases of which are positioned in the combustion and dilution spaces respectively. Thus the dilution air issuing from the radial tubes is deflected from its initial direction towards the outer portion of the combustion space and impinges upon the stream of gas undergoing combustion and emanating from the inner portion of said space, this deflection and impingement producing eddies which assist completion of the combustion. Further, all of the dilution air diverted thus travels over a longer distance than it would had it escaped directly into the dilution space. Thus, not only is completion of the combustion improved, but the dilution effect is also improved, thereby enabling the length of the chamber to be reduced.

In a preferred form of embodiment, said inclined wall is formed with a set of protruding radial walls inclined like the blades of an axial compressor, with each radial tube opening out between two consecutive walls externally of or in the space comprised therebetween. These walls or blades may be inclined in either direction whereby to impart to the stream of diverted dilution air a gyration in a direction identical or opposite to the fuel injection rotation, thereby increasing the swirl effect and hence the rapidity with which the temperature of the burnt gas is rendered homogeneous and the combustion completed.

In an alternative constructional form, the larger base of the substantially frusto-conical inclined wall is located in a diametrical plane through the radial tubes. As a result, part of the dilution air is diverted by the inclined wall towards the outer portion of the combustion chamber, the remainder of this air escaping directly into the dilution space. This solution is particularly suitable for preventing the dilution air from "freezing" the combustion process.

In the arrangements referred to precedingly, the feed air designed to enter at the base of the combustion space through the inner wall of the chamber flows into the hollow guide vanes of the nozzle diaphragm of the first stage of the turbine in order to reach the internal cavity of said wall.

It is however possible, in accordance with this invention, to make direct use of part of the dilution air to supply air to this internal cavity by resorting to means akin to those described in U.S. patent application Ser. No. 477,184 filed Aug. 4, 1965.

In accordance therewith, one out of every two radial tubes opens adjacent the inclined wall, facing an opening of substantially equal size formed thereon.

In an alternative advantageous form of embodiment, the inclined wall is formed, opposite each radial tube and adjacent its larger base, with holes substantially smaller than the terminal cross-section of the corresponding radial tube.

In both these latter constructional forms, all or part of the combustion air led into the internal cavity of the inner wall is supplied by the radial tubes, with the remainder passing through the hollow guide vanes of the nozzle diaphragm of the first stage of the turbine, the length of which is consequently reduced.

The description which follows with reference to the accompanying non-limitative exemplary drawings will give a clear understanding of how the invention can be carried into practice.

Figure 1:
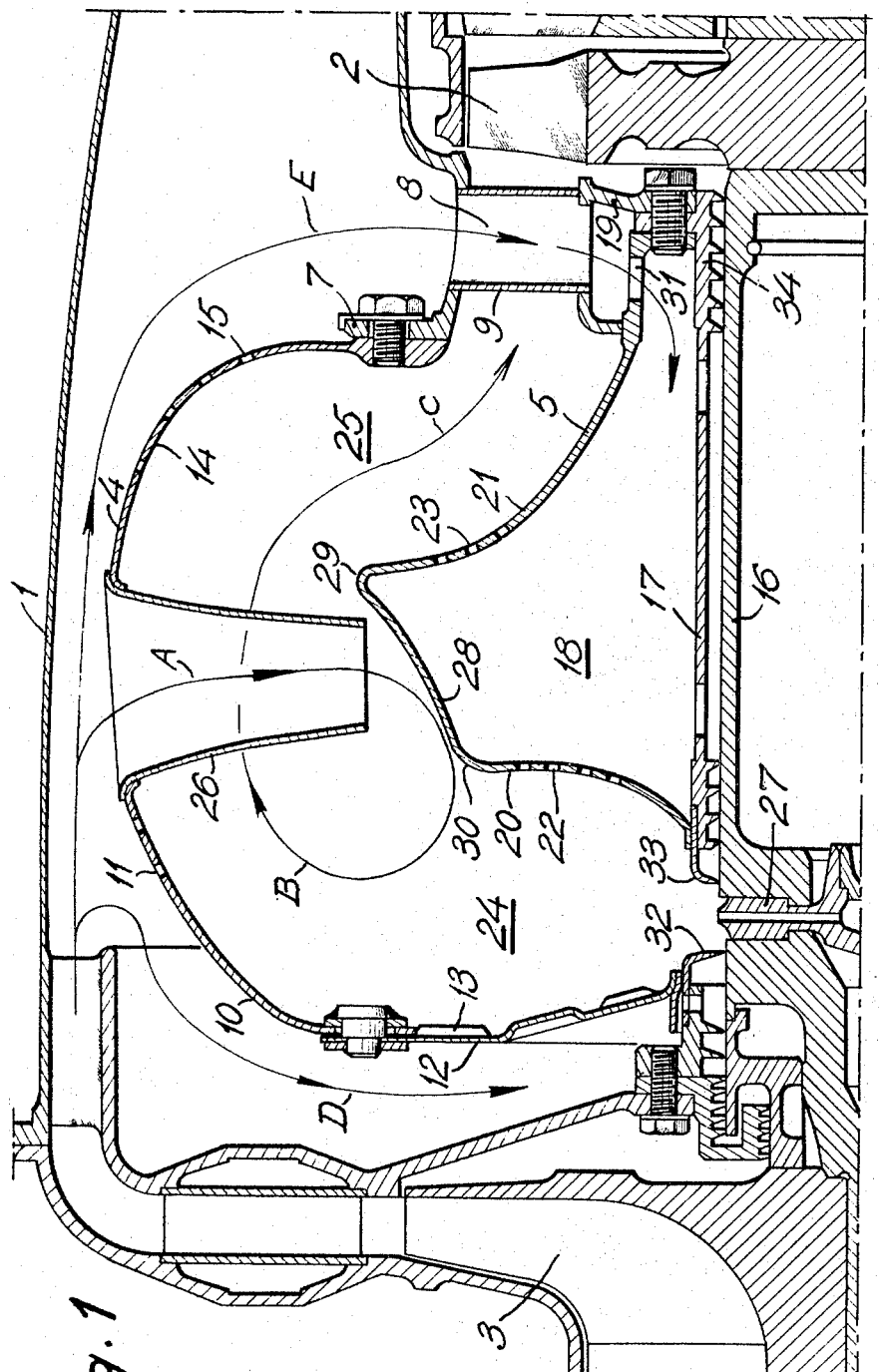
FIG. 1 is a radial half-sectional view of a combustion chamber according to the invention, of which the inner wall embodies a solid inclined portion opposite the radial tubes.

Referring first to FIG. 1, the combustion chamber shown therein is contained within the casing 1 of turbine 2 and positioned between the compressor 3 and said turbine. The combustion chamber is bounded by an outer wall 4 and an inner wall 5. The outer wall 4 is joined at its rear portion with the outer ring 7 of the first turbine stage nozzle diaphragm 8 equipped with hollow vanes 9; the wall 4 comprises a swirl plate 10 having holes 11 therein, a mixer 12 with shrouded slots 13 and, on its rear portion 14, a series of holes 15.

The inner wall 5 surrounds the turbine shaft 16 after the labyrinth seal 17 has been placed in position, and bounds an internal cavity 18; the wall 5 is joined to the inner ring 19 of the turbine nozzle diaphragm 8. The wall 5 is formed, on its swirl plate 20 and its rear portion 21, with sets of holes 22 and 23. The chamber bounded by the outer and inner walls 4 and 5 is of recumbent L-shape and comprises a combustion space 24 along the small vertical branch of the L and a dilution space 25 along the long horizontal branch thereof.

Substantially in the zone where these spaces meet, dilution air tubes 26 are welded to the outer wall 4 and are constricted at their ends whereby to increase the velocity of the air flowing therethrough.

As is well known in the annular combustion chamber art, liquid fuel is fed by centrifugal rotary injection by means of an injection wheel 27 fed with fuel through a hollow shaft connected to any convenient supply source.

Facing the dilution tubes 26, the inner wall 5 comprises, between its swirl plate 20 and its rear plate 21, a substantially frusto-conical inclined portion 28 of which the larger base 29 is positioned in the dilution space 25 and the smaller base 30 in the combustion space 24.

Thus, the streams of dilution air flow substantially along the path A through the tubes 26 and, after impinging upon the inclined portion 28, are diverted towards the outer zone of the combustion space where they meet the stream of gas undergoing combustion and emanating from the inner part of said space. This meeting produces eddies as at B which assist in completing the combustion in the space 24, the dilution air escaping along C together with the burnt gas, of which it will have thus increased the temperature homogeneity. It is to be noted that the path A, B, C, is longer than the path which the dilution air would have followed had it flowed directly from radial tubes 26 into dilution space 25, thus making it possible to shorten the chamber.

Part of the combustion air is conveyed to the base of the flame, as well known per se, along the path D, via the holes 13. Another part of this combustion air follows the path E, flows through hollow vanes 9 of nozzle diaphragm 8, then through the holes 31 formed at the rear of the inner wall of the chamber, and then enters the internal cavity 18 of the inner wall and is distributed through the holes 22 at the base of the combustion space 24. Yet another part of the combustion air enters the chamber in small amounts beneath the lips of labyrinth seals 32 and 33 in order to feed the base of the flame and ensure that the latter is held properly about the injection wheel 27.

Part of the air entering the cavity 18 escapes through the holes 23 to act as dilution air. Lastly, a little of the air conveyed between internal cavity 18 and labyrinth seal 17 cools turbine shaft 16 and, after flowing into the rear 34 of seal 17, also cools the turbine inlet disc.

Figure 2:
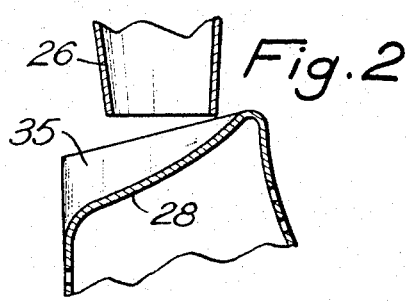
FIGS. 2 and 3 show fragmentally, respectively in radial section and in plan view, an alternative embodiment wherein said inclined portion is equipped with gyration blades.
Figure 3:
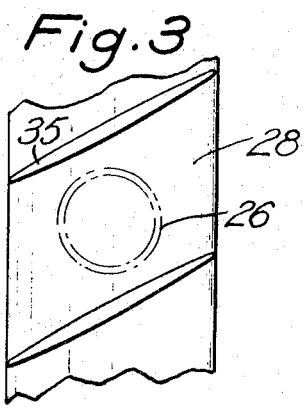

With a view to improving the temperature homogeneity of the burnt gas by further swirling the dilution air in the outer part of combustion chamber 24, the inclined portion 28 of inner wall 5 may, as shown in FIGS. 2 and 3, be formed with a series of radial walls 35 inclined, relatively to the engine axis, in the direction of rotation of the injection wheel 27 or in the direction opposite thereto, whereby to gyrate the dilution air about that axis.

Figure 4:
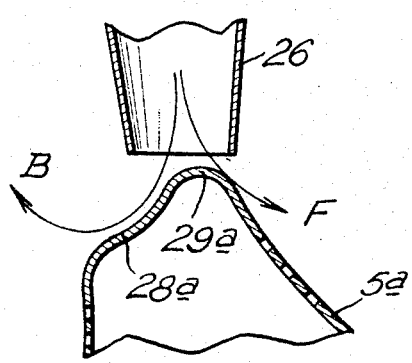
FIG. 4 is a view corresponding to FIG. 2, wherein said inclined portion terminates at a diametrical plane through the radial tubes.

Reference is now had to the form of embodiment shown in FIG. 4, in which the inclined portion 28a of the substantially frusto-conical inner combustion chamber wall 5a has its larger base 29a located in a diametrical plane intersecting the radial tubes 26. As a result, the dilution air conveyed through these tubes is divided into two flows, of which one is diverted at B by the inclined wall 27a as in the case of FIG. 1, and the other flows directly along F into the dilution space 25.

With a view to reducing the length of the hollow-vaned nozzle diaphragm of the first stage of the turbine, part of the air issuing from the radial tubes can be used to supply the internal cavity of the inner chamber wall with air in whole or in part so as to convey that air through the holes 22 into the internal portion of combustion space 24. To that end, recourse may be had to one of the forms of embodiment shown in FIGS. 5 to 9.

Figure 5:
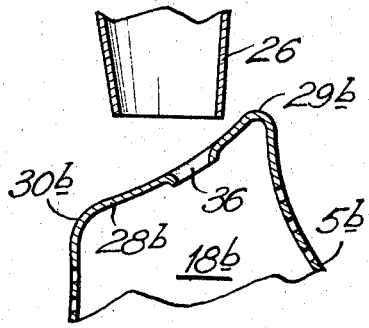
FIGS. 5 through 7 illustrate possible alternative embodiments for FIG. 1, wherein holes are formed in the inclined portion of the inner wall of the combustion chamber.
Figure 6:
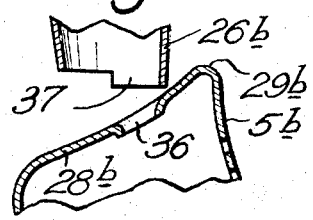

Referring first to FIG. 5, opposite each radial tube 26, the inclined portion 28b of inner wall 5b is formed adjacent its larger base 29b with a hole 36 through which part of the dilution air enters the internal cavity 18b of said wall. Reference to FIG. 6 shows that radial tube 26b can additionally comprise an extension 37 facing the corresponding hole 36.

Figure 7:
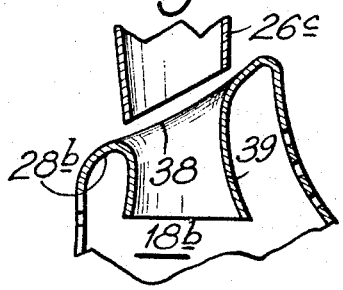
Figure 8:
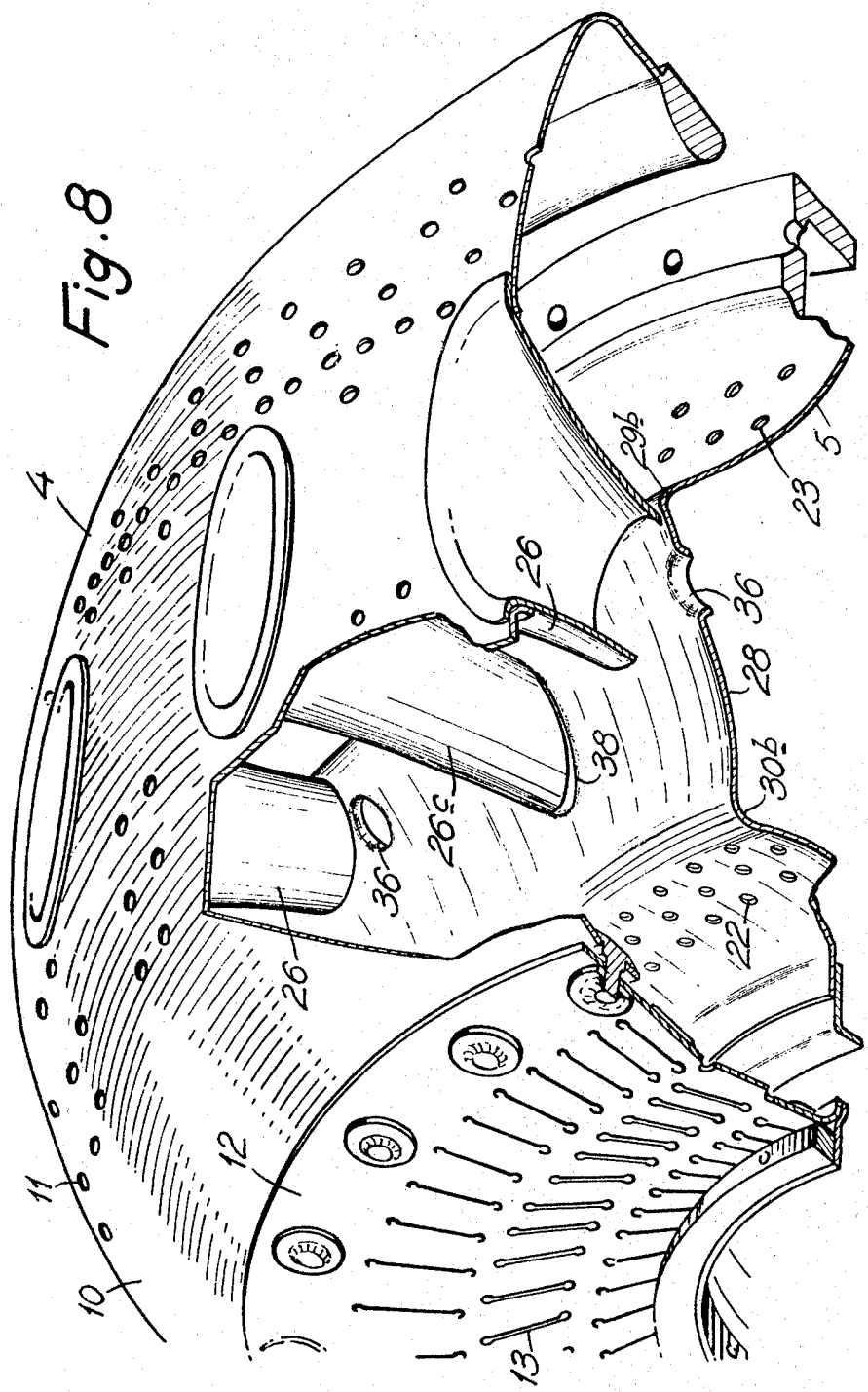
FIG. 8 is a partial perspective view of a combustion chamber according to the invention equipped with successive radial tubes in accordance with FIGS. 5 and 7.

In FIGS. 7 and 8, one out of every two radial tubes faces a hole 36 formed in inclined wall 28b, as in FIG. 5, whereas the other radial tube 26c is extended to a point adjacent inclined portion 28b, in which is formed an opening 38 extended by a diffuser 39 as described in the U.S. patent application referred to in the preamble. In this case, the dilution air from one out of every two radial tubes feeds the internal cavity 18b directly, whereas the dilution air issuing from the next tube is divided into two unequal flows, of which the smaller enters internal cavity 18b and the larger is diverted by the inclined wall portion 28b and enters the outer zone of the combustion space.

Figure 9:
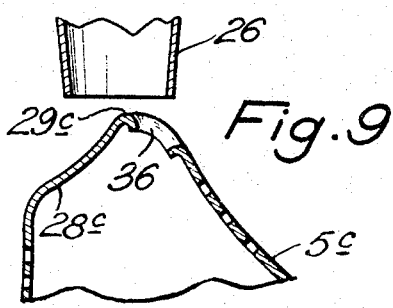
FIG. 9 is a view corresponding to FIGS. 5 through 7 for the case of an inclined wall of the kind shown in FIG. 4.

FIG. 9 shows a form of embodiment similar to FIG. 5, in which the hole 36 is formed on the larger base of the inclined wall 28c, which is similar to the inclined wall 28a of FIG. 4.

Since all or part of the air for the internal cavity is supplied by the radial tubes, the nozzle diaphragm of the first stage of the turbine, the length of which is notably reduced, may be equipped with solid or hollow vanes for passing therethrough the remaining air or only the air required for cooling them.

The slope and position of the inclined wall portion 28 will be determined according to the required degree of swirl and the desired air apportionment. The size of the holes 36 or the openings 38 will depend on the manner in which the air issuing from radial tubes 26 is to be divided into combustion air, combustion completing air, and direct dilution air.

As described in the aforesaid U.S. patent application, the radial tubes preferably have an elliptical cross-section and may embody openings for introducing a portion of the dilution air into the gas directly.

What I claim is:

1. In a centrifugal rotary fuel injection-type annular combustion chamber of recumbent L-shape having a casing positioned between a compressor and a turbine having a hollow-vaned nozzle diaphragm in its first stage, an outer wall and an inner wall in said casing bounding a combustion space formed along the small vertical branch of the recumbent L and a gas dilution space along the long horizontal branch of said recumbent L, an internal cavity bounded by said inner wall and open-ended radial tubes for conveying dilution air extending from said outer chamber wall towards the inner chamber wall in the zone of division of said combustion and gas dilution spaces, said tubes having outlets facing the inner wall, the improvement wherein said inner chamber wall includes an inclined substantially frusto-conical portion facing said outlets of said dilution air conveying radial tubes, said frusto-conical portion having smaller and larger bases positioned in said combustion and dilution spaces respectively.

2. A combustion chamber as claimed is claim 1, wherein said inclined wall portion is provided with a series of protruding radial walls slanting in one direction or the other in a manner akin to the blades of an axial compressor, the outlet of each radial tube opening out between two consecutive slanting walls externally of the space comprised therebetween.

3. A combustion chamber as claimed in claim 1, wherein said inclined wall portion is provided with a series of protruding radial walls slanting in one direction or the other in a manner akin to the blades of an axial compressor, the outlet of each radial tube opening between two consecutive slanting walls into the space comprised therebetween.

4. A combustion chamber as claimed in claim 1, wherein the larger base of said substantially frusto-conical inclined wall portion is positioned in a diametrical plane intersecting said radial tubes.

5. A combustion chamber as claimed in claim 1, including means for passing the feed air that is to enter at the base of said combustion space through said inner chamber wall, into said hollow vanes of the nozzle diaphragm of the first stage of the turbine and thence into said internal cavity of said inner wall.

6. A combustion chamber as claimed in claim 1, wherein the outlet of one of every two of said radial tubes opens out adjacent said inclined wall, opposite an opening of substantially the same size formed on said inclined wall.

7. A combustion chamber as claimed in claim 1, wherein said inclined wall is provided opposite each of said radial tubes and adjacent its larger base with holes the cross-sectional area of which is substantially smaller than the terminal sectional area of the outlet of the corresponding radial tube.

8. A combustion chamber as claimed in claim 6, wherein at least part of the combustion air conveyed into said internal cavity of said inner wall is supplied by said radial tubes, and means for passing the remaining combustion air through said nozzle diaphragm vanes together with the air for cooling the latter.

9. A combustion chamber as claimed in claim 1, wherein said radial tubes have an elliptical cross-section and openings for introducing part of the dilution air into the gas directly.

References Cited

UNITED STATES PATENTS 2,856,755  10/1958  Szydlowski _____ 60—39.36

FOREIGN PATENTS 1,084,087  6/1960  Germany.

RALPH D. BLAKESLEE, *Primary Examiner.*

MARK M. NEWMAN, *Examiner.*